United States Patent
Arguello et al.

(10) Patent No.: US 12,456,080 B2
(45) Date of Patent: Oct. 28, 2025

(54) NETWORK DIGITAL TWIN OF AIRLINE OPERATIONS

(71) Applicant: GE AVIATION SYSTEMS LLC, Grand Rapids, MI (US)

(72) Inventors: Michael Arguello, Austin, TX (US); Charles P. Ephraim, Austin, TX (US); Jonathan Mark Dunsdon, Murphys, CA (US); Stephen Jonathan Davis, Eastleigh (GB); Kristin M. Schanche, Fairfield, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 285 days.

(21) Appl. No.: 17/504,732

(22) Filed: Oct. 19, 2021

(65) Prior Publication Data
US 2023/0118644 A1    Apr. 20, 2023

(51) Int. Cl.
*G06Q 10/00* (2023.01)
*G06N 20/00* (2019.01)
*G06Q 10/0631* (2023.01)

(52) U.S. Cl.
CPC ........ *G06Q 10/0631* (2013.01); *G06N 20/00* (2019.01)

(58) Field of Classification Search
CPC ......... G06Q 10/0631; G06Q 10/06395; G06Q 10/00; G06Q 10/02; G06Q 10/06; G06Q 10/10; G06Q 30/02; G06N 20/00; G05B 2219/31357
See application file for complete search history.

(56) References Cited

U.S. PATENT DOCUMENTS

| | | | |
|---|---|---|---|
| 5,948,040 A * | 9/1999 | DeLorme | G06Q 10/02 701/426 |
| 7,472,080 B2 * | 12/2008 | Goel | G06Q 30/0621 705/5 |
| 9,443,434 B2 | 9/2016 | Hale et al. | |
| 9,542,849 B1 | 1/2017 | Bertram et al. | |
| 9,658,623 B2 | 5/2017 | Navarro et al. | |
| 10,008,122 B2 | 6/2018 | Hardt et al. | |
| 10,614,723 B2 | 4/2020 | Hardt et al. | |
| 2003/0141411 A1 * | 7/2003 | Pandya | G06Q 10/02 244/114 R |

(Continued)

OTHER PUBLICATIONS

Wesely, Dan, A Machine Learning Approach to Predict Aircraft Landing Times using Mediated Predictions from Existing Systems, 2021, Mosaic ATM, p. 1-19. (Year: 2021).*

*Primary Examiner* — Joseph M Waesco
(74) *Attorney, Agent, or Firm* — Enang Akan; Darrow Mustafa PC (57) ABSTRACT

Systems and methods of planning and scheduling resources of an airline include using machine learning models to generate custom behavioral characteristics for a plurality of operational components of the airline based on operations data. The custom behavioral characteristics are used to define inputs and outcomes in simulations of the operational components of the airline. The simulation outputs performance indicators and a feedback loop captures previously ignored interactions between the operational components of the airline based on the performance indicators and custom behavioral characteristics of inputs and outcomes corresponding to the plurality of operational components of the airline.

14 Claims, 4 Drawing Sheets

(56) References Cited

U.S. PATENT DOCUMENTS

| | | | |
|---|---|---|---|
| 2007/0219833 A1* | 9/2007 | Trautman | G06Q 10/063 |
| | | | 705/5 |
| 2010/0042283 A1* | 2/2010 | Kell | G06Q 10/0875 |
| | | | 705/29 |
| 2010/0305984 A1* | 12/2010 | Ben-Yitschak | G06Q 10/025 |
| | | | 707/769 |
| 2013/0166135 A1* | 6/2013 | Dunsdon | G07C 5/0808 |
| | | | 701/29.3 |
| 2014/0358415 A1 | 12/2014 | McDonald et al. | |
| 2015/0324501 A1* | 11/2015 | Desell | G01C 23/00 |
| | | | 703/2 |
| 2017/0262635 A1* | 9/2017 | Strauss | G06Q 30/0275 |
| 2017/0283085 A1* | 10/2017 | Kearns | G06Q 50/40 |
| 2019/0005826 A1 | 1/2019 | Lax et al. | |
| 2019/0057327 A1* | 2/2019 | Arguello | G06N 20/00 |
| 2019/0340934 A1 | 11/2019 | Villa et al. | |
| 2020/0209842 A1* | 7/2020 | Koizumi | G06N 20/10 |
| 2021/0073669 A1* | 3/2021 | Banerjee | G06N 3/045 |
| 2021/0081501 A1* | 3/2021 | RoyChowdhury | G06F 40/295 |
| 2021/0383706 A1* | 12/2021 | Gibbons, II | G08G 5/26 |
| 2024/0161035 A1* | 5/2024 | Lyman | G16H 10/20 |

\* cited by examiner

NETWORK DIGITAL TWIN OF AIRLINE OPERATIONS

FIELD

The present disclosure generally relates to systems and methods for analyzing, modelling, and optimizing operations of an airline and, more specifically, to creating a networked digital twin of an entire operations of an airline in order to capture interactions between different airline operational components that were previously ignored.

BACKGROUND

Airline operations may include creating and providing travel products to customers, managing various distribution channels of products to customers, scheduling material assets and crew members to individual flights, scheduling maintenance, managing air traffic flow, managing usage of airport resources, optimizing for fuel cost and fuel usage, and predicting and recovering from disruptions to operations. These activities are highly complex and have traditionally been broken down into more manageable operational components with optimizations performed at the individual operational components level. This practice, although necessitated by the enormous complexity of airline operations, leads to airline operations systems being ignorant of certain interactions between the different airline operational components. In addition, models of individual operational components are often simplified in order to make their usage more feasible in daily operations. These missed interactions and simplified models can lead to inaccurate predictions and schedule disruptions that can have unanticipated consequences that ripple across the entire air traffic system.

Therefore, there is a need for improved modelling, prediction, and recovery techniques in airline operations.

SUMMARY

According to an aspect of the present disclosure, a method of identifying actions to improve a performance indicator related to airline operations in a system comprising a plurality of operational components, the method includes receiving operations data corresponding to the plurality of operational components. The operations data may include data corresponding to resources, and rules governing the usage of one or more of the resources. The method may further include training one or more models to generate custom behavioral characteristics corresponding to inputs or outcomes for each of the plurality of operational components, and simulating operations data using the generated one or more custom behavioral characteristics to determine values for the inputs of the plurality of operational components. The simulated operations data may include a first scenario including one or more performance indicators corresponding to the first scenario. The method may further include displaying, using a user interface, the simulated one or more performance indicators.

According to another aspect of the present disclosure, the operational components include a flight scheduling component, an aircraft route component, a crew scheduling component, a passenger itinerary component, a passenger welfare and compensation component, and a financial component.

According to yet another aspect of the present disclosure, the method of identifying actions to improve a performance indicator related to airline operations may further include generating a feedback loop where the outcomes of one or more operational components are used to modify the inputs of one or more operational components, training a machine learning model to identify interactions between the plurality of operational components based on the feedback loop, and refining the simulated one or more performance indicators using the trained machine learning model.

According to yet another aspect of the present disclosure, the method of identifying actions to improve a performance indicator related to airline operations may further include using the operations data and the one or more models to predict a disruption. The disruption may include a violation of one or more of the rules, or a performance indicator failing to meet a given threshold.

According to yet another aspect of the present disclosure, the method of identifying actions to improve a performance indicator related to airline operations may further include generate one or more alternative scenarios. Each of the one or more alternative scenarios may include a trade-off wherein at least one performance indicator is improved in comparison to the first scenario. The method may further include simulating the operations data, including the one or more performance indicators for each of the one or more alternative scenarios, receiving selection of a scenario among the first scenario and the one or more alternative scenarios, and scheduling usage of the resources corresponding to the plurality of operational components based on the selected scenario.

According to yet another aspect of the present disclosure, the one or more models may include one or more of quantitative models, statistical models, simulation models, machine learning models, or artificial intelligence models.

According to yet another aspect of the present disclosure, the one or more models may include a machine learning model trained using both the operations data and the simulated operations data.

Additional features, advantages, and embodiments of the processes and systems described herein will be set forth in the detailed description which follows, and in part will be readily apparent to those skilled in the art from that such features, advantages, and embodiments are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter claimed and described herein. The accompanying drawings are provided to facilitate a further understanding of the various embodiments, and are incorporated into and constitute a part of this specification. The drawings illustrate the various embodiments described herein, and together with the description serve to explain the principles and operations of the subject matter claimed and described herein.

DETAILED DESCRIPTION

The present disclosure generally relates to systems and methods for modelling and simulating airline operations. More specifically, the present disclosure relates to using machine learning models to identify interactions between various airline operational components that have historically been treated independently. Airline operational components may include, as non-limiting examples, a flight scheduling component, an aircraft route component, a crew scheduling component, a passenger itinerary component, a passenger welfare and compensation component, and a financial component. Traditionally, these and other airline and/or air traffic control operational components have been treated independently in order to simplify the problem of forecasting and planning airline operations. The independent treatment of airline operational components, although useful in practice, inherently allows for missed interactions between the operational components.

In the disclosed embodiments, in order to identify and characterize these missed interactions, machine learning models may be trained on operations data. Operations data may include but is not limited to historical operations data, simulated operations data, rules, and human annotations and/or inputs corresponding to a plurality of different operational components, or even all operational components for which data is available. Because the inputs to one operational component are often influenced or determined by the outputs of another operational component, this modelling captures and characterizes interactions and feedback loops between the different operational components. As a non-limiting example for illustration purposes only, a weather operational component may predict that a particular flight has a high likelihood of being delayed. One solution to this problem may be to grant the affected flight a larger time window in the flight schedule. However, this action may cause some passengers to miss one or more connecting flights, causing further disruptions and lost revenue. Although this non-limiting example is somewhat intuitive, many other such interactions may exist that are neither direct nor easily identified. The systems and methods disclosed herein provide insight into these and other interactions between different operational components and improved predictions for what affects alternative actions may have on performance indicators. Performance indicators may include, but are not limited to, safety, customer satisfaction, on-time performance, passenger load factor, environmental impact, revenue generation, cost reduction, asset utilization, or any other performance indicator that an airline may consider. Performance indicators may be identified and defined however an airline sees fit in order to meet their business goals. The disclosed systems and methods provide visibility into the impact of decisions on whatever performance indicators one may choose to define.

In addition, simplified models used in predicting and planning airline operations for individual operational components may sacrifice accuracy for usability. As a non-limiting example for illustration purposes only, systems for predicting the number of passengers that do not show up for a specific flight may be based on a probability distribution function determined based on large samples across many different flights. While these systems may be highly accurate in their aggregate predictions of no-show passengers, significant prediction errors may still occur for a specific flight, which ultimately results in lost revenue. The systems and methods described herein may include machine learning models trained on historical data to generate custom behavioral characteristics to represent important inputs and outcomes of individual operational components or variables internal to individual operational components. These custom behavioral characteristics may be used to define the characteristics of input variables used in an airline operations simulator, allowing the simulator to more accurately model and predict outcomes, including at least one performance indicator.

Figure 1:
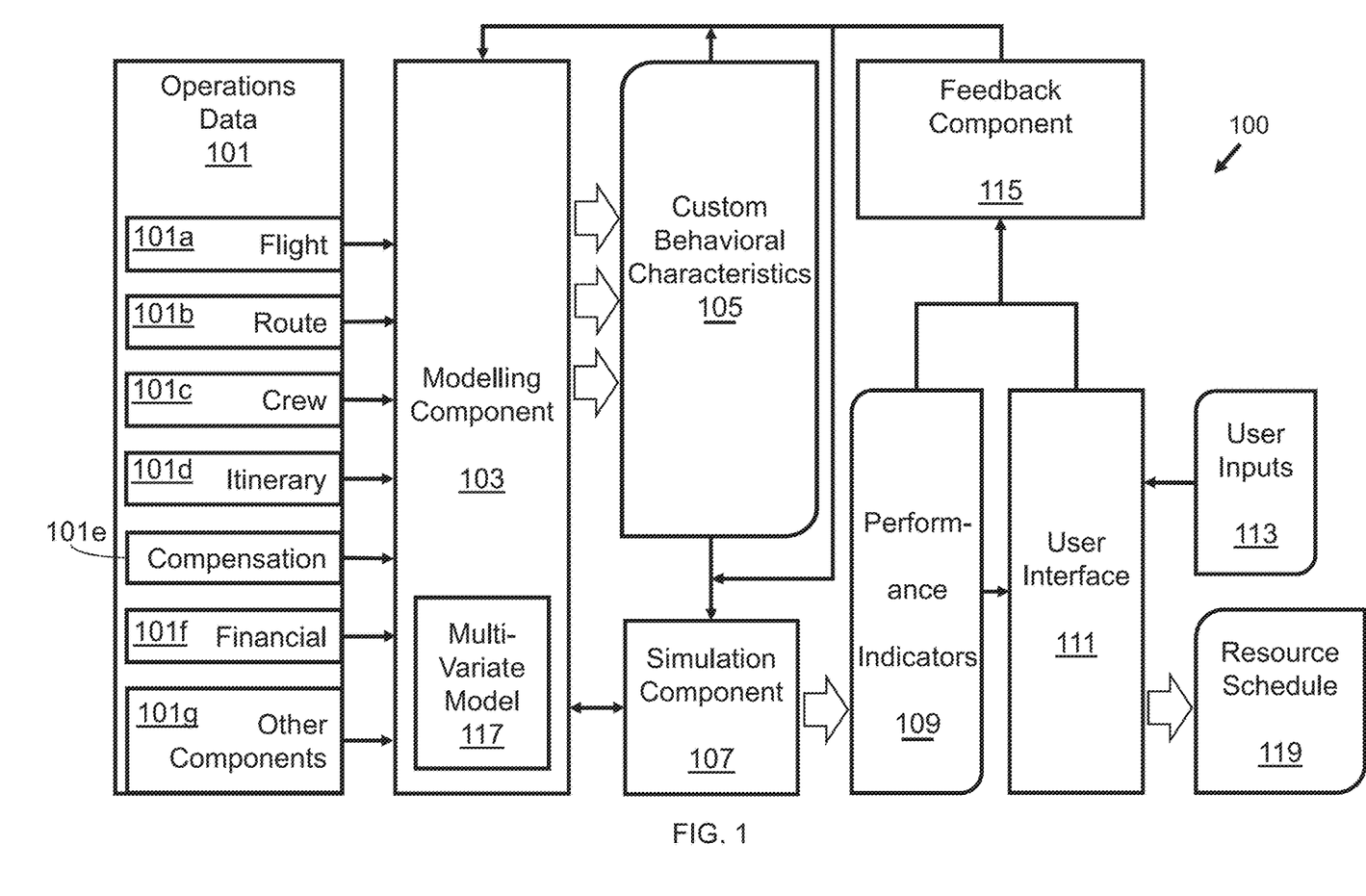
FIG. 1 depicts a block diagram of an illustrative system for modeling and simulating airline operations, according to one or more embodiments shown and described herein.

Referring now to FIG. 1, a block diagram of an illustrative system 100 for modeling and simulating airline operations is provided. Simulating airline operations may include simulating operations data 101 of the airline. According to embodiments, operations data 101 is fed to a modelling component 103. Operations data 101 may include operations data 101 from any of the operational components 101*a*-101*g* related to or having impact on operations. Operations data 101 may include data corresponding to multiple resources, and rules. Rules may include expressions of laws, regulations, policies, and limits on the usage of one or more of the resources. Some non-limiting examples of operational components 101*a*-101*g* may include, but are not limited to, a flight scheduling component 101*a*, an aircraft route component 101*b*, a crew scheduling component 101*c*, a passenger itinerary component 101*d*, a passenger welfare and compensation component 101*e*, and a financial component 101*f*, or any other operational component 101*g* of airline operations. An operational component 101*a*-101*g* may be represented by a subset of operations data 101.

The flight scheduling component 101*a* may include systems, such as computer systems 203, configured to determine when and where an airline will provide flight services. Optimizing a flight schedule to maximize airline profit may involve consideration of data related to pricing, marketing, crew resources, maintenance requirements, and ground services that may set constraints on the flight scheduling component 101*a*.

The aircraft route component 101*b* may include systems, such as computer systems 203, configured to assign specific aircraft to particular airline routes in an airline schedule. Aircraft route assignment may involve consideration of data related to demand on particular routes and overlap of flight legs between particular cities.

The crew scheduling component 101*c* may include systems, such as computer systems 203, configured to assign crew members to particular flights or flight legs in an airline schedule. Scheduling crew members to flights may involve consideration of data related to safety or labor regulations, such as a maximum number of hours that a crew member can work before mandatory allowance for sleep, accommodations for crew members aboard flights, and efforts to periodically return each crew member to a home location.

The passenger itinerary component 101*d* may include systems, such as computer systems 203, configured to create passenger itineraries using the flight schedule, by piecing together flight legs between a passenger's origin and destination. Creating passenger itineraries may include consideration of data related to layover times, and cost, demand, and airplane capacity at each flight leg.

The passenger welfare and compensation component 101*e* may include systems, such as computer systems 203, configured to anticipate and recover from disruptions to a flight schedule, such as delays, cancellations, and missed flights. Passenger welfare and compensation may involve consideration of data related to past disruptions, current flight schedule, weather, and alternative available flight and ground resources.

The financial component 101f may include systems, such as computer systems 203, configured to determine different classes of fares and pricing. The financial component 101f may consider date related to demand, price sensitivity, available space on an aircraft, scheduling or other airline operations. It should be appreciated that other operational components may be used and the overall airline operations may be organized in different sets of operational components including more or fewer operational components.

The modelling component 103 may be configured to use one or more models to generate one or more custom behavioral characteristics 105. The models may include quantitative models, statistical models, simulation models, machine learning models, or artificial intelligence models. According to some embodiments, the modelling component 103 uses one or more machine learning models, trained on the operations data 101, to generate the custom behavioral characteristics 105. Machine learning models may include but are not limited to Neural Networks, Linear Regression, Logistic Regression, Decision Tree, SVM, Naive Bayes, kNN, K-Means, Random Forest, Dimensionality Reduction Algorithms, or Gradient Boosting algorithms, and may employ learning types including but not limited to Supervised Learning, Unsupervised Learning, Reinforcement Learning, Semi-Supervised Learning, Self-Supervised Learning, Multi-Instance Learning, Inductive Learning, Deductive Inference, Transductive Learning, Multi-Task Learning, Active Learning, Online Learning, Transfer Learning, or Ensemble Learning.

Each custom behavioral characteristic 105 may correspond to a variable that used in simulating or analyzing airline operations. Variables may correspond to inputs or outcomes of the various operational components 101a-101g. Inputs may include, but are not limited to, weather data, travel demand, maps, flight paths, resource availability, assets, maintenance schedules or any other data used in airline operations. Outcomes may include, but are not limited to, passenger itineraries, asset availability, flight schedules, projected costs and revenues, on-time likelihood, or any other data that may result from processing input data in airline operations. The outcomes of one operational component 101a-101g may also influence or determine the inputs of the same operational component 101a-101g or one or more other operational components 101a-101g. This is illustrated in FIG. 1 by an arrow from custom behavioral characteristics 105 that feeds back into the modelling component 103. The custom behavioral characteristics 105 characterize the historical and expected behavior of the variables used in simulating airline operations, allowing the simulation component 107 to predict not only the most likely outcomes of scheduled operations, but also the likelihood of disruptive events and probability of cascading effects through the air traffic system.

According to some embodiments, the simulation component 107 is configured to simulate operations of the airline using the custom behavioral characteristics 105 to determine the values of one or more variables corresponding to airline operations. The simulation component 107 may be configured to generate one or more performance indicators 109 as a result of the simulation. Performance indicators 109 may include outcomes of one or more of the operational components 101a-101g or user-defined expressions based on one or more elements of operations data 101, outcomes of the operational components 101a-101g, or custom behavioral characteristics 105. As a non-limiting example, one performance indicator 109 used in the airline industry includes load factor. A load factor may be expressed as a ratio of passenger miles to available seat miles. Higher load factors may indicate a more efficient operation. Performance indicators 109 may include, but are not limited to, indicators of safety, customer satisfaction, on-time performance, passenger load factor, environmental impact, revenue generation, cost reduction, asset utilization, or any other performance indicator 109 that an airline may consider. Different airlines may prioritize different attributes of airline service differently. Thus, a performance indicator 109 may be based on any data or expression considered to reflect a measure of performance or a proxy of performance.

The simulation component 107 may interact with the modelling component 103 to identify and characterize interactions between the various operational components 101a-101g. Using the modelling component 103, the simulation component 107 models not only the behavior of the individual operational components 101a-101g, but the complex interactions between the operational components 101a-101g. This allows the simulation component 107 to capture and characterize previously ignored interactions between the operational components 101a-101g and more accurately predict outcomes of the operational components 101a-101g including performance indicators 109.

One or more performance indicators 109 may be displayed through a user interface 111 based on user preferences. Any performance indicator 109 selected or defined by a user may be displayed in the user interface 111. The user interface 111 may be configured to display a set of performance indicators 109 for each of multiple different scenarios simulated by the simulation component 107. The user interface 111 may also be configured to display a representation of a key input variable that may have a high impact on one or more of the displayed performance indicators 109. This would allow the user to make informed decisions about what aspects of scheduled operations may be modified to avoid disruptions or improve performance as represented by the performance indicators 109. The user interface 111 may be further configured to receive user inputs 113 to modify one or more input variables corresponding to one or more of the operational components 101a-101g or select from among multiple alternative scenarios that produce different values of selected performance indicators 109. Based on user inputs 113, the simulation component 107 may re-run simulations and refine or update the performance indicators 109. According to some embodiments, the modelling component 103 is updated based on user input 113 such as, but not limited to, the selection from among multiple alternative scenarios. The user interface 111 may request additional user input 113 regarding reasons why a selected scenario was selected. As a non-limiting example, the user interface 111 may request information about which performance indicator 109 was considered important in the selected alternative scenario. Updating the modelling component 103 based on received inputs may allow the system 100 to continuously improve while in use.

Based on one or more of the performance indicators 109 or user inputs 113 received by the user interface 111, the feedback component 115 may be configured to update or modify inputs or outcomes used in the modelling component 103. The feedback component 115 allows the multi-variate model 117 to identify and characterize interactions between the various operational components 101a-101g and user decisions received from the user interface 111.

The user interface 111 may be further configured to receive a user input 113 selecting one or multiple alternative scenarios and output a resource schedule 119 based on the selected scenario. The resource schedule 119 may define usage of resources which is expected to meet or exceed the performance indicated by the performance indicators 109.

Figure 2:
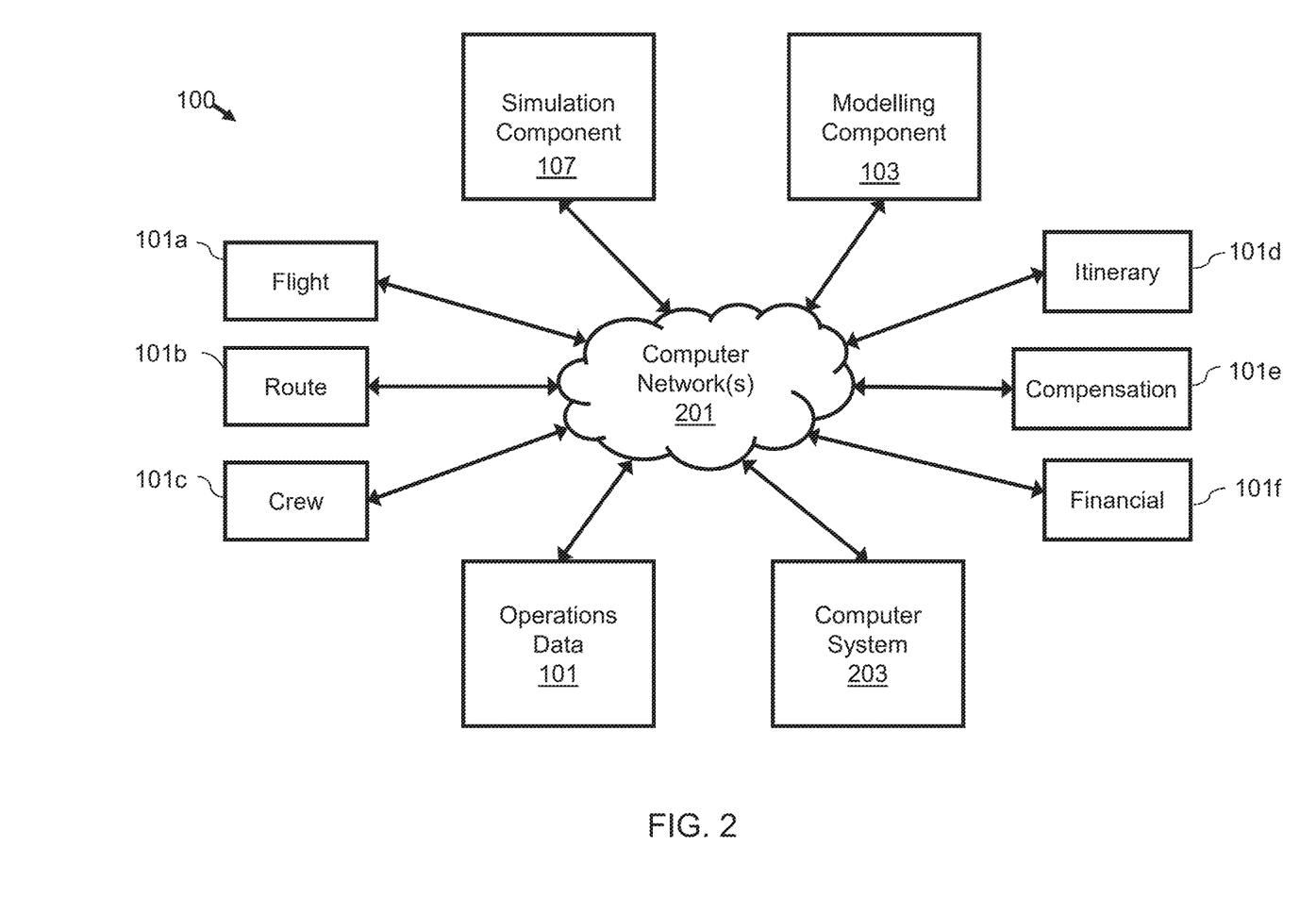
FIG. 2 depicts a system diagram showing the interconnection of various components of the system of FIG. 1, according to one or more embodiments shown and described herein.

Referring now to FIG. 2, a system diagram showing the interconnection of various components of the system 100 of FIG. 1 is presented. As illustrated, the various components, including but not limited to, the operations data 101, the modelling component 103, the simulation component 107, the flight scheduling component 101a, the aircraft route component 101b, the crew scheduling component 101c, the passenger itinerary component 101d, the passenger welfare and compensation component 101e, and the financial component 101f may communicate with each other through a computer network 201.

In addition, one or more of the components in system 100 of FIG. 1 or FIG. 2 may be implemented on a computer system 203 including at least a processor and a non-transitory, computer-readable medium that includes programming instructions stored thereon that are executable by the processor. Further, any of the components may be implemented in a single computer system, distributed across multiple computer systems, or using cloud computing resources. Some non-limiting examples of computer systems 203 include laptops, desktops, smartphone devices, tablets, PCs, cloud computing platforms, or the like. Various cloud computing platforms are well-known and available under product names including, but not limited to Amazon Web Services, Google Cloud Platform, Microsoft Azure, and IBM Bluemix. According to some embodiments, components in system 100 of FIG. 1 may also include computing devices comprising a processor, non-transitory computer-readable media, and a network communication device. Any of the components of FIG. 1 or FIG. 2 may be implemented using computer readable instructions stored on the non-transitory computer-readable media such that, when executed by a processor, the computer readable instructions cause the processor to perform any of the functions described in the disclosed embodiments. A person of ordinary skill in the art will understand what computer systems 203, processors, or memory may be used in the disclosed embodiments.

The computer network 201 may include one or more of a personal area network, a local area network, grid computing network, wide area network, cellular networks, satellite networks, the internet, a virtual network in a cloud computing environment, and/or any combinations thereof. Accordingly, as a non-limiting example, the operations data 101, the modelling component 103, the simulation component 107, the user interface 111, and the feedback component 115 can be communicatively coupled to the one or more computer networks 201 via a wide area network, via a local area network, via a personal area network, via a cellular network, via a satellite network, via a cloud network, or the like. Suitable local area networks may utilize wired Ethernet, wireless technologies such as, for example, wireless fidelity (Wi-Fi), and/or virtual network resources in a cloud computing environment. Suitable personal area networks may utilize wireless technologies such as, for example, IrDA, Bluetooth, Wireless USB, Z-Wave, ZigBee, and/or other near field communication protocols. Suitable personal area networks may utilize wired computer buses such as, for example, USB, Serial ATA, eSATA, and FireWire. Suitable cellular networks include, but are not limited to, technologies such as LTE, WiMAX, UMTS, CDMA, and GSM. Accordingly, the one or more computer networks 201 can be utilized as a wireless access point by the system 100 of FIG. 1 to access one or more servers implementing one or more components of FIG. 1.

Figure 3:
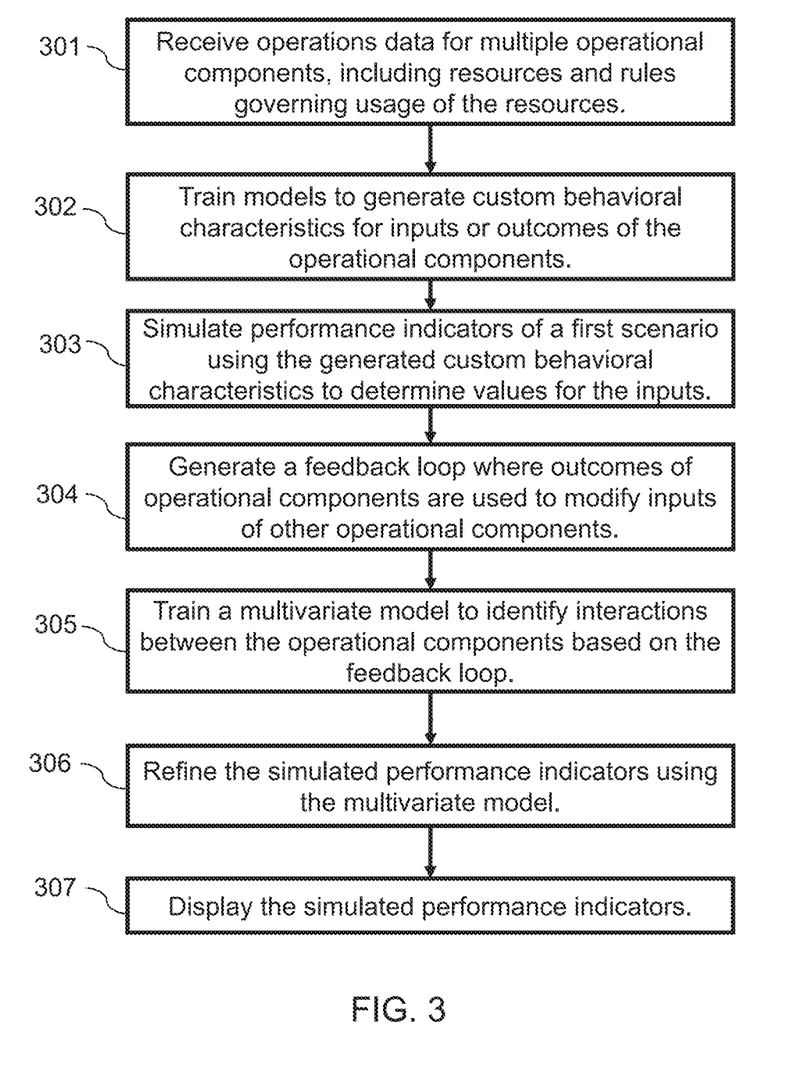
FIG. 3 depicts a flowchart of an illustrative method for modelling and simulating airline operations, according to one or more embodiments shown and described herein.

Referring now to FIG. 3, a method for modelling and simulating airline operations is presented. The steps illustrated in FIG. 3 may be performed by the components illustrated in FIG. 1 and/or FIG. 2 or any combination thereof.

At block 301, the system 100 receives operations data 101 for multiple operational components 101a-101g, including data corresponding to resources and rules governing usage of one or more of the resources. The operations data 101 includes data corresponding to each of the operational components 101a-101g. Data may be any computer readable data stored on computer-readable media. The operations data 101 may include, but is not limited to, data representing weather, airline disruptions, flight scheduling, airports, aircraft, maintenance, aircraft routes, crew scheduling, passenger itinerary, passenger welfare and compensation, finances, including cost, revenue and/or profit, customer modeling, product distribution, air traffic flow control, or any other aspect of airline operations. Operations data 101 may include any data generated by an airline or transmitted to or from the airline in the course of airline operations. Data may be received by the system 100 by any means of computer communication, including the computer network 201, as described and illustrated in relation to FIGS. 1 and 2. Data may also be read from local or networked computer storage or memory.

At block 302, the system 100 trains one or more models to generate custom behavioral characteristics 105 corresponding to inputs or outcomes for each of the plurality of operational components 101a-101g. According to some embodiments, the modelling component 103 generates the custom behavioral characteristics 105 using one or more models. Models may include statistical models representing a probability density function that captures the typical values that data may take based on the operations data 101. According to some embodiments, the models include one or more machine learning models trained on the operations data 101 and the custom behavioral characteristics 105 include the learned behavioral output of the machine learning models. The custom behavioral characteristics 105 define the limits and probabilities of possible inputs and outcomes of the plurality of operational components 101a-101g. According to some embodiments, the machine learning models are trained using operations data 101 comprising both historical operations data and simulated operations data.

Airline operations are highly complex, and a change in a variable, such as adding a route to a new location or deleting a route to a currently serviced location, can produce a cascade of effects that propagates through airline operations in unpredictable ways. Using a computer in a brute force manner to evaluate all relevant factors and predict even a single outcome that may occur can be computationally intensive. Further, although an outcome may be possible based on these intensive computations, the outcome is not necessarily probable. Running enough iterative computations to determine the relative frequency with which each possible outcome may occur in response to a changed variable is impossible on a time scale necessary to make real-world decisions.

Using machine learning, as described herein, the salient characteristics of airline operations are transformed into the custom behavioral characteristics 105. The custom behavioral characteristics 105 simplify complex operations data 101 into a range, ranges, or sets of values that an input or outcome may take and associated probabilities for those values. The custom behavioral characteristics 105 are more flexible and more accurate than standard probability density functions commonly used in statistics. The simulation component 107 may use the custom behavioral characteristics 105 in combination with rules to predict realistic outcomes. Rules may include expressions of laws, regulations, policies, and limits on the usage of one or more of the resources. The custom behavioral characteristics 105 transformation of airline operations data 101 eliminates the need for the simulation component 107 to be aware of every element of raw operations data 101 and enables the simulation component 107 to rapidly simulate a plurality of different scenarios, including scenarios based on events not represented in historical operations data. The custom behavioral characteristics 105 enable these simulations to be performed on a scale of seconds to minutes, rather than days or longer, enabling real-world application and real-time optimization of airline operations.

At block 303, the system 100 simulates operations data using the generated one or more custom behavioral characteristics 105 to determine values for the inputs or outcomes of the plurality of operational components 101a-101g. According to some embodiments, the simulation is performed by the simulation component 107. The simulation component 107 may comprise one or more computer systems configured to simulate outcomes of airline operations based on inputs and/or operations data 101. Simulations may be performed based on one or more expressions of relationships between operational components 101a-101g, or between inputs and outcomes. The simulation component 107 may be configured to automatically run multiple iterations using various input values and/or outcome values by using a known simulation technique, such as a Monte Carlo simulation. According to some embodiments, the simulated operations data may comprise a first scenario including one or more performance indicators 109 corresponding to the first scenario. The performance indicators 109 may include operations data 101, inputs or outcomes corresponding to the operational components 101a-101g, or an expression based on any combination thereof. Performance indicators 109 may be defined by a user, may be different for different airlines, and may reflect the performance characteristics or proxies for performance characteristics that the user deems valuable. The performance indicator 109 is not limited to any particular performance metric (e.g., profit, on-time operation, safety) and any expression including inputs, outputs, operations data 101, internal simulation variables, or any combination thereof may be used as a performance indicator 109.

At block 304, system 100 generates a feedback loop where the outcomes of one or more operational components 101a-101g are used to modify the inputs of one or more operational components 101a-101g. According to some embodiments, generation of the feedback loop is performed by the feedback component 115. According to some embodiments, the feedback component 115 receives outputs from the simulation component 107, receives performance indicators 109, or receives values from the custom behavioral characteristics 105, and feeds these values to the simulation component 107 or the modelling component 103 as inputs. The feedback component 115 may be configured to compare a plurality of simulations from the simulation component 107 and determine whether additional operations data 101 or user inputs 113 produce an improvement of accuracy of the simulations. According to some embodiments, the feedback component 115 may be configured to define a mapping between outcomes and inputs to the modelling component 103 and/or the simulation component 107. According to some embodiments, the feedback component 115 may be configured to recursively compute influences of the outcome on the inputs to the modelling component 103 and/or the simulation component 107. According to some embodiments, the outcomes include simulation results, one or more performance indicators 109, one or more user inputs 113 received through a user interface 111 or any combination thereof. The feedback loop enables the system 100 to identify and characterize previously ignored interactions between the plurality of operational components 101a-101g.

At block 305 the system 100 trains the modelling component 103 to identify and characterize interactions between the plurality of operational components 101a-101g based on the feedback loop. According to some embodiments, the modelling component 103 includes a multi-variate model 117. The identification of interactions between the operational components 101a-101g brings the system 100 together into a whole and improves predictions of outcomes, generation of custom behavioral characteristics 105, and the generation of performance indicators 109.

At block 306, the system 100 refines the simulated one or more performance indicators 109 using the modelling component 103. According to some embodiments, the refining of the performance indicators 109 is performed by the simulation component 107. At block 307, the system 100 displays the simulated one or more performance indicators 109. According to some embodiments, the display of the performance indicators 109 is performed by the user interface 111.

Figure 4:
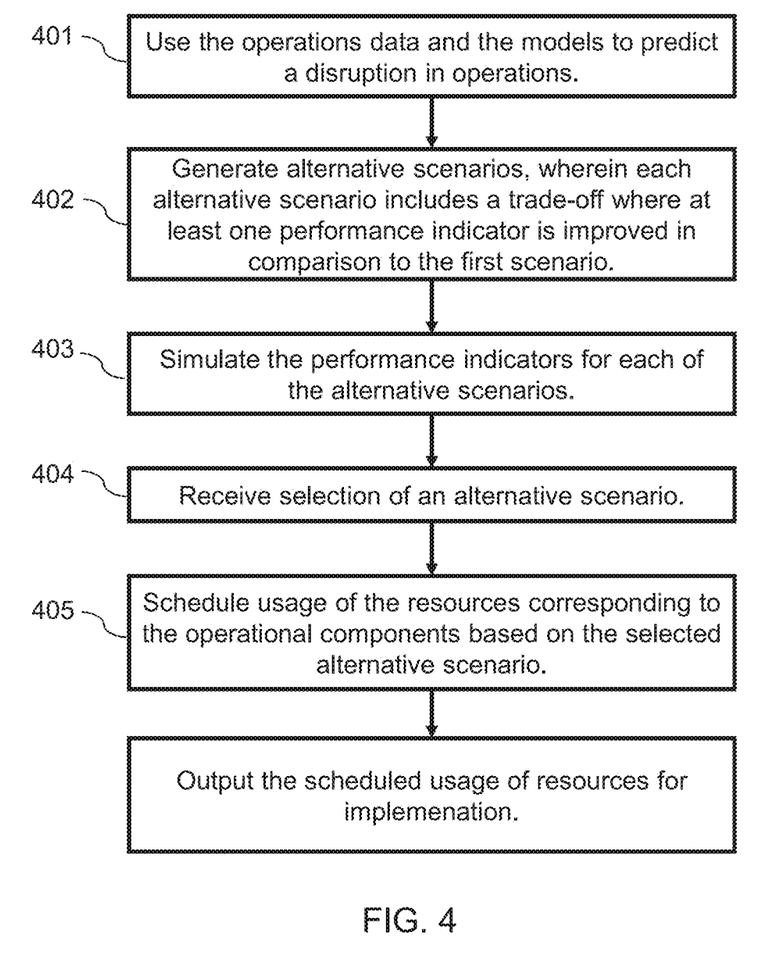
FIG. 4 depicts another flowchart of an illustrative method for modelling and simulating airline operations, according to one or more embodiments shown and described herein.

Referring now to FIG. 4, another flowchart of a method for modelling and simulating airline operations is presented. The steps illustrated in FIG. 4 may be performed by the components illustrated in FIG. 1 and/or FIG. 2 or any combination thereof.

One function related to airline operations scheduling and planning includes anticipating and recovering from disruptions. In practice, disruptions may include, but are not limited to, flight cancellations due to weather, flight delays, missing passengers or crew, or unexpected maintenance issues. In the historical data, these disruptions may be represented in inputs or outcomes violating the rules governing the usage of resources or a performance indicator 109 failing to meet a given threshold. Identifying and handling these disruptions without propagating additional disruptions through the air traffic system can improve airline performance and profitability.

At block 401, the system 100 uses the operations data 101 and the one or more models to predict a disruption. A disruption may include a violation of one or more of the rules, a mismatch between scheduled operations and actual outcomes, or a performance indicator 109 failing to meet a given threshold. As a non-limiting example, a disruption may occur when a passenger misses a flight for which they were scheduled. Recovering from this disruption may include scheduling the passenger on a different flight, and adjusting their itinerary to accommodate any missed connections. As another non-limiting example, a disruption may occur when a flight is delayed or canceled due to weather conditions or a maintenance issue. Recovering from this disruption may include rescheduling the flight, or re-scheduling each of the passengers on different flights. In some instances, recovering from a disruption may include providing incentives, discounts, refunds, vouchers, or other accommodations to affected passengers. In yet another non-limiting example, a disruption may occur when one or more crew members are unable to catch a flight. This can create delays or cancellation, and recovering from this disruption may include rescheduling other crew members in order to maintain a flight schedule or meet certain constraints on a performance indicator 109. Each of these non-limiting example disruptions may be identifiable in operations data 101. According to some embodiments, the prediction of a disruption may be performed by the simulation component 107.

At block 402, the system 100 generates one or more alternative scenarios. Each of the alternative scenarios may include a trade-off. A trade-off may be represented as a performance indicator 109 being improved in comparison to the same performance indicator 109 for another scenario, for example, the first scenario described in reference to FIG. 3. Alternative scenarios may be generated based on changes made to the usage of resources, such as changing a flight time, cancelling a flight, delaying a flight, changing the tail number assigned to a travel segment, reassigning one or more passengers or crew members to a flight, changing a maintenance schedule, or any other modification to usage of resources that can be modified. According to some embodiments, the simulation component 107 may perform the generation of alternative scenarios.

At block 403, the system 100 simulates the operations data, including the one or more performance indicators 109 for each of the one or more alternative scenarios. Simulation for the alternative scenarios is performed in the same manner as simulation of the first scenario. According to some embodiments, simulated operations data is fed back into the modelling component 103, through the feedback component 115, and used, in addition to the operations data 101, to train the machine learning models that generate the custom behavioral characteristics 105 for the various operational components 101a-101g. According to some embodiments, the simulated operations data 101 that is fed back into the modelling component 103 may be generated based on one or more of historical operations data, rules, or custom behavioral characteristics 105.

At block 404, the system 100 receives selection from among the first scenario and the one or more alternative scenarios. According to some embodiments, the selection may be received through user input 113. In some embodiments, the user may provide performance indicator 109 criteria and thresholds, and the system 100, or another computer system, may automatically select a scenario based on the provided performance indicator 109 criteria and thresholds.

At block 405, the system 100 schedules usage of the resources corresponding to the plurality of operational components 101a-101g based on the selected scenario. Scheduling the resources may include generating a time schedule for tail numbers, maintenance, crew members, or any other assignment of assets or resources for an airline.

At block 406, the system 100 outputs the scheduled usage of resources for implementation. Outputting the scheduled usage of resources may be done by displaying or printing one or more elements of the schedule. The output may correspond to one or more of the operational components 101a-101g. According to some embodiments, some aspects of airline scheduling may be implemented using computer systems 203 and computer networks 201, and outputting the scheduled usage of resources may include storing values, used or generated by the disclosed systems and methods, in computer readable memory or in computer storage locations that are designated as repositories for official scheduling data. For example, crew work schedules may be stored in computer-readable networked storage and certain details of crew schedules may be accessible by crew members and other supervisory employees. Crew members may access and view the stored work schedules so they know when and where to show up for work. As another non-limiting example, certain resources, such as gate access at an airport or other ground resources used by an airline, may be requested from a supplier and access may be granted using computer systems. The disclosed embodiments may be configured to interface with these computer systems to generate a properly formatted request for resources. These schedules, and other airline operations data 101 representing the scheduling of assets, may be automatically modified or updated in computer readable storage by the systems disclosed herein. Thus, the output and implementation of some aspects of airline scheduling may be performed through the reading and/or storage of data.

It should be appreciated that the methods discussed above in relation to FIG. 3 and FIG. 4 are not limited to the order of steps presented. For example, the presentation of multiple alternatives need not be preceded by predicting a disruption in operations. Two or more alternative scenarios, having differences is one or more performance indicators 109 may be presented for selection without identifying a disruption or potential disruption in operations. It should also be appreciated that one or more steps of the methods of FIG. 3 and FIG. 4 can be completed simultaneously. For example, in some embodiments, several models, including machine learning models or multi-variate models may be trained or executed simultaneously using the historical data. It should further be appreciated that the methods of FIG. 3 and FIG. 4 may omit steps or include additional steps depending on the circumstances. For example, the display of performance indicators 109 in some embodiments may be unnecessary in embodiments where the system 100 automatically selects a scenario based on user-defined criteria and performance indicator 109 thresholds.

It should now be understood that the devices, systems 100, and methods described herein provide systems and methods for modelling and simulating airline operations. More specifically, the present disclosure describes systems and methods for using machine learning models to identify interactions between various airline operational components 101a-101g that have historically been treated independently. The disclosure describes how machine learning models are trained on operations data 101 from multiple different operational components 101a-101g, or even all operational components for which data is available. The systems and methods disclosed herein provide insight into previously ignored interactions between different operational components of an airline and improved predictions for what affects alternative actions may have on performance indicators 109. The disclosed systems and methods provide visibility into the impact of decisions on whatever performance indicators 109 one may choose to define.

In addition, the systems 100 and methods described herein include machine learning models trained on historical data to generate custom behavioral characteristics 105 to represent inputs and outcomes of individual operational components 101a-101g or variables internal to individual operational components 101a-101g. These custom behavioral characteristics 105 may be used to define the characteristics of input variables used in an airline operations simulator, allowing the simulator to more accurately model and predict outcomes, including performance indicators 109.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an end-point of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or endpoints defining range(s) of values.

Where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

It is noted that recitations herein of "at least one" component, element, etc., or "one or more" should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

Further aspects of the invention are provided by the subject matter of the following clauses:

A method of identifying actions to improve a performance indicator related to airline operations in a system comprising a plurality of operational components, the method comprising: receiving operations data corresponding to the plurality of operational components, wherein the operations data includes data corresponding to resources, and rules governing the usage of one or more of the resources; training one or more models to generate custom behavioral characteristics corresponding to inputs or outcomes for each of the plurality of operational components; simulating operations data using the generated one or more custom behavioral characteristics to determine values for the inputs of the plurality of operational components, wherein the simulated operations data comprises a first scenario including one or more performance indicators corresponding to the first scenario; and displaying, using a user interface, the simulated one or more performance indicators.

The method of any preceding clause, wherein the operational components include a flight scheduling component, an aircraft route component, a crew scheduling component, a passenger itinerary component, a passenger welfare and compensation component, and a financial component.

The method of any preceding clause, further comprising: generating a feedback loop where the outcomes of one or more operational components are used to modify the inputs of one or more operational components; training a machine learning model to identify interactions between the plurality of operational components based on the feedback loop; and refining the simulated one or more performance indicators using the trained machine learning model.

The method of any preceding clause, further comprising: using the operations data and the one or more models to predict a disruption, wherein the disruption includes: a violation of one or more of the rules, or a performance indicator failing to meet a given threshold.

The method of any preceding clause, further comprising generate one or more alternative scenarios, wherein each of the one or more alternative scenarios includes a trade-off wherein at least one performance indicator is improved in comparison to the first scenario; simulating the operations data, including the one or more performance indicators for each of the one or more alternative scenarios; receiving selection of a scenario among the first scenario and the one or more alternative scenarios; and scheduling usage of the resources corresponding to the plurality of operational components based on the selected scenario.

The method of any preceding clause, wherein the one or more models include one or more of quantitative models, statistical models, simulation models, machine learning models, or artificial intelligence models.

The method of any preceding clause, wherein the one or more models include a machine learning model trained using both the operations data and the simulated operations data.

A non-transitory computer-readable medium storing instructions that, when executed by a processor, cause the processor to perform steps comprising: receiving operations data corresponding to a plurality of operational components, wherein the operations data includes data corresponding to resources, and rules governing the usage of one or more of the resources; training one or more models to generate custom behavioral characteristics corresponding to inputs or outcomes for each of the plurality of operational components; simulating operations data using the generated one or more custom behavioral characteristics to determine values for the inputs of the plurality of operational components, wherein the simulated operations data comprises a first scenario including one or more performance indicators corresponding to the first scenario; and displaying, using a user interface, the simulated one or more performance indicators.

The non-transitory computer-readable medium of any preceding clause, storing further instructions that, when executed by a processor, cause the processor to further perform steps comprising: receiving operations data from operational components corresponding to a flight scheduling component, an aircraft route component, a crew scheduling component, a passenger itinerary component, a passenger welfare and compensation component, and a financial component.

The non-transitory computer-readable medium of any preceding clause, storing further instructions that, when executed by a processor, cause the processor to further perform steps comprising: generating a feedback loop where the outcomes of one or more operational components are used to modify the inputs of one or more operational components; training a machine learning model to identify interactions between the plurality of operational components based on the feedback loop; and refining the simulated one or more performance indicators using the machine learning model.

The non-transitory computer-readable medium of any preceding clause, storing further instructions that, when executed by a processor, cause the processor to further perform steps comprising: using the operations data and the one or more models to predict a disruption, wherein the disruption includes: a violation of one or more of the rules, or a performance indicator failing to meet a given threshold.

The non-transitory computer-readable medium of any preceding clause, storing further instructions that, when executed by a processor, cause the processor to further perform steps comprising: generating one or more alternative scenarios, wherein each of the one or more alternative scenarios includes a trade-off wherein at least one performance indicator is improved in comparison to the first scenario; simulating the operations data, including the one or more performance indicators for each of the one or more alternative scenarios; receiving selection of a scenario among the first scenario and the one or more alternative scenarios; and scheduling usage of the resources corresponding to the plurality of operational components based on the selected scenario.

The non-transitory computer-readable medium of any preceding clause, storing further instructions that, when executed by a processor, cause the processor to further perform steps comprising: using one or more of quantitative models, statistical models, simulation models, machine learning models, or artificial Intelligence models to generate the custom behavioral characteristics corresponding to inputs or outcomes for each of the plurality of operational components.

The non-transitory computer-readable medium of any preceding clause, storing further instructions that, when executed by a processor, cause the processor to further perform steps comprising: using a machine learning model, trained using both the operations data and the simulated operations data, to generate the custom behavioral characteristics corresponding to inputs or outcomes for each of the plurality of operational components.

A system for identifying actions to improve a performance indicator related to airline operations in a system comprising a plurality of operational components, the system comprising: a modelling component configured to: receive operations data corresponding to the plurality of operational components, wherein the operations data includes data corresponding to resources, and rules governing the usage of one or more of the resources; and train one or more models to generate custom behavioral characteristics corresponding to inputs or outcomes for each of the plurality of operational components; a simulation component configured to: simulate operations data using the generated one or more custom behavioral characteristics to determine values for the inputs of the plurality of operational components, wherein the simulated operations data comprises a first scenario including one or more performance indicators corresponding to the first scenario; and a user interface configured to: display the simulated one or more performance indicators.

The system of any preceding clause, wherein the operational components include a flight scheduling component, an aircraft route component, a crew scheduling component, a passenger itinerary component, a passenger welfare and compensation component, and a financial component.

The system of any preceding clause, further comprising a feedback component configured to: generate a feedback loop where the outcomes of one or more operational components are used to modify the inputs to one or more operational components; wherein the modelling component is further configured to: train a machine learning model to identify interactions between the plurality of operational components based on the feedback loop; and wherein the simulation component is further configured to: refine the simulated one or more performance indicators using the machine learning model.

The system of any preceding clause, wherein the simulation component is further configured to: use the operations data and the one or more models to predict a disruption, wherein the disruption includes: a violation of one or more of the rules, or a performance indicator failing to meet a given threshold.

The system of any preceding clause, wherein the simulation component is further configured to: generate one or more alternative scenarios, wherein each of the one or more alternative scenarios includes a trade-off wherein at least one performance indicator is improved in comparison to the first scenario; simulate the operations data, including the one or more performance indicators for each of the one or more alternative scenarios; and wherein the user interface is further configured to: receiving selection of a scenario among the first scenario and the one or more alternative scenarios; and schedule usage of the resources corresponding to the plurality of operational components based on the selected scenario.

What is claimed is:

1. A method of identifying actions to improve a performance indicator related to airline operations in a system comprising a plurality of operational components, the method comprising:
   receiving operations data corresponding to the plurality of operational components, wherein the operations data includes data corresponding to resources, and rules governing the usage of one or more of the resources;
   training one or more machine learning models, using the received operations data, to generate custom behavioral characteristics corresponding to inputs or outcomes for each of the plurality of operational components, each custom behavioral characteristic corresponding to a variable used in simulating airline operations;
   simulating operations of the airline using the generated one or more custom behavioral characteristics to determine values for the inputs of the plurality of operational components, wherein the simulated operations comprise a first scenario including one or more performance indicators corresponding to the first scenario;
   generating a feedback loop where the one or more performance indicators are used as inputs to train the one or more machine learning models;

training the one or more machine learning models to identify interactions between the plurality of operational components based on the feedback loop;

refining the one or more performance indicators using the trained one or more machine learning models; and displaying, using a user interface, the refined one or more performance indicators.

2. The method of claim 1, wherein the operational components include a flight scheduling component, an aircraft route component, a crew scheduling component, a passenger itinerary component, a passenger welfare and compensation component, and a financial component.

3. The method of claim 1, further comprising:

using the operations data and the one or more machine learning models to predict a disruption, wherein the disruption includes:

a violation of one or more of the rules, or a performance indicator failing to meet a given threshold.

4. The method of claim 3, further comprising generate one or more alternative scenarios, wherein each of the one or more alternative scenarios includes a trade-off wherein at least one performance indicator is improved in comparison to the first scenario;

simulating the operations data, including the one or more performance indicators for each of the one or more alternative scenarios;

receiving selection of a scenario among the first scenario and the one or more alternative scenarios; and scheduling usage of the resources corresponding to the plurality of operational components based on the selected scenario.

5. The method of claim 1, wherein the one or more machine learning models include one or more of quantitative models, statistical models, simulation models, machine learning models, or artificial intelligence models.

6. A non-transitory computer-readable medium storing instructions that, when executed by a processor, cause the processor to perform steps comprising:

receiving operations data corresponding to a plurality of operational components, wherein the operations data includes data corresponding to resources, and rules governing the usage of one or more of the resources;

training one or more machine learning models, using the received operations data, to generate custom behavioral characteristics corresponding to inputs or outcomes for each of the plurality of operational components, each custom behavioral characteristic corresponding to a variable used in simulating airline operations;

simulating operations of the airline using the generated one or more custom behavioral characteristics to determine values for the inputs of the plurality of operational components, wherein the simulated operations comprise a first scenario including one or more performance indicators corresponding to the first scenario;

generating a feedback loop where the one or more performance indicators are used as inputs to train the one or more machine learning models;

training the one or more machine learning models to identify interactions between the plurality of operational components based on the feedback loop;

refining the one or more performance indicators using the trained one or more machine learning models; and displaying, using a user interface, the refined one or more performance indicators.

7. The non-transitory computer-readable medium of claim 6, storing further instructions that, when executed by a processor, cause the processor to further perform steps comprising:

receiving operations data from operational components corresponding to a flight scheduling component, an aircraft route component, a crew scheduling component, a passenger itinerary component, a passenger welfare and compensation component, and a financial component.

8. The non-transitory computer-readable medium of claim 6, storing further instructions that, when executed by a processor, cause the processor to further perform steps comprising:

using the operations data and the one or more machine learning models to predict a disruption, wherein the disruption includes:

a violation of one or more of the rules, or a performance indicator failing to meet a given threshold.

9. The non-transitory computer-readable medium of claim 8, storing further instructions that, when executed by a processor, cause the processor to further perform steps comprising:

generating one or more alternative scenarios, wherein each of the one or more alternative scenarios includes a trade-off wherein at least one performance indicator is improved in comparison to the first scenario;

simulating the operations data, including the one or more performance indicators for each of the one or more alternative scenarios;

receiving selection of a scenario among the first scenario and the one or more alternative scenarios; and scheduling usage of the resources corresponding to the plurality of operational components based on the selected scenario.

10. The non-transitory computer-readable medium of claim 6, storing further instructions that, when executed by a processor, cause the processor to further perform steps comprising:

using one or more of quantitative models, statistical models, simulation models, machine learning models, or artificial Intelligence models to generate the custom behavioral characteristics corresponding to inputs or outcomes for each of the plurality of operational components.

11. A system for identifying actions to improve a performance indicator related to airline operations in a system comprising a plurality of operational components, the system comprising a processor configured to:

receive operations data corresponding to the plurality of operational components, wherein the operations data includes data corresponding to resources, and rules governing the usage of one or more of the resources;

train one or more machine learning models, using the received operations data, to generate custom behavioral characteristics corresponding to inputs or outcomes for each of the plurality of operational components, each custom behavioral characteristic corresponding to a variable used in simulating airline operations;

simulate operations of the airline using the generated one or more custom behavioral characteristics to determine values for the inputs of the plurality of operational components, wherein the simulated operations comprise a first scenario including one or more performance indicators corresponding to the first scenario;

generate a feedback loop where the one or more performance indicators are used as inputs to train the one or more machine learning models;

train the one or more machine learning models to identify interactions between the plurality of operational components based on the feedback loop;

refine the one or more performance indicators using the trained one or more machine learning models; and display, using a user interface, the refined one or more performance indicators.

12. The system of claim 11, wherein the operational components include a flight scheduling component, an aircraft route component, a crew scheduling component, a passenger itinerary component, a passenger welfare and compensation component, and a financial component.

13. The system of claim 11, wherein the processor is further configured to:

use the operations data and the one or more machine learning models to predict a disruption, wherein the disruption includes:

a violation of one or more of the rules, or a performance indicator failing to meet a given threshold.

14. The system of claim 13, wherein the processor is further configured to:

generate one or more alternative scenarios, wherein each of the one or more alternative scenarios includes a trade-off wherein at least one performance indicator is improved in comparison to the first scenario;

simulate the operations data, including the one or more performance indicators for each of the one or more alternative scenarios; and wherein the user interface is further configured to:

receiving selection of a scenario among the first scenario and the one or more alternative scenarios; and schedule usage of the resources corresponding to the plurality of operational components based on the selected scenario.

\* \* \* \* \*